United States Patent [19]

Smith

[11] Patent Number: 4,643,954

[45] Date of Patent: Feb. 17, 1987

[54] DEVICE FOR EQUALIZING MOLTEN ELECTROLYTE CONTENT IN A FUEL CELL STACK

[75] Inventor: James L. Smith, Lemont, Ill.

[73] Assignee: The United States of America as represented by the Department of Energy, Washington, D.C.

[21] Appl. No.: 812,575

[22] Filed: Dec. 23, 1985

[51] Int. Cl.$^4$ ............................................. H01M 8/10
[52] U.S. Cl. ...................................... 429/26; 429/34; 429/14; 429/16
[58] Field of Search ...................... 429/16, 14, 104, 35, 429/36, 37, 38, 39, 30

[56] References Cited

U.S. PATENT DOCUMENTS

| | | | |
|---|---|---|---|
| 4,080,487 | 3/1978 | Reiser | 429/16 |
| 4,317,866 | 3/1982 | Trocciola et al. | 429/41 |
| 4,329,403 | 5/1982 | Baker | 429/35 |
| 4,404,267 | 9/1983 | Iacovangelo et al. | 429/41 |
| 4,414,294 | 11/1983 | Guthrie | 429/35 |
| 4,460,495 | 7/1984 | Iacovangelo | 252/518 |
| 4,548,874 | 10/1985 | Katz et al. | 429/18 |
| 4,591,538 | 5/1986 | Kunz | 429/16 |
| 4,596,748 | 6/1986 | Katz et al. | 429/13 |

OTHER PUBLICATIONS

Final Report, EPRI RP-1085, (1983), At Section 8, Task 5, Development of Improved Cell Stack Operating Stability.

Primary Examiner—Donald L. Walton
Assistant Examiner—Steven P. Marquis
Attorney, Agent, or Firm—Hugh W. Glenn; Robert J. Fisher; Judson R. Hightower

[57] ABSTRACT

A device for equalizing the molten electrolyte content throughout the height of a fuel cell stack is disclosed. The device includes a passageway for electrolyte return with electrolyte wettable wicking material in the opposite end portions of the passageway. One end portion is disposed near the upper, negative end of the stack where electrolyte flooding occurs. The second end portion is placed near the lower, positive end of the stack where electrolyte is depleted. Heating means are provided at the upper portion of the passageway to increase electrolyte vapor pressure in the upper wicking material. The vapor is condensed in the lower passageway portion and conducted as molten electrolyte in the lower wick to the positive end face of the stack. An inlet is provided to inject a modifying gas into the passageway and thereby control the rate of electrolyte return.

9 Claims, 2 Drawing Figures

DEVICE FOR EQUALIZING MOLTEN ELECTROLYTE CONTENT IN A FUEL CELL STACK

CONTRACTUAL ORIGIN OF THE INVENTION

The U.S. Government has rights in this invention pursuant to Contract No. W-31-109-ENG-38 between the U.S. Department of Energy and the University of Chicago, the Operator of Argonne National Laboratory.

BACKGROUND OF THE INVENTION

This invention relates to a device for use in Molten Carbonate Fuel cell stacks in an effort to equalize electrolyte content throughout the stack during operation.

Molten Carbonate Fuel Cells are well known and described in many prior publication and patents, e.g. U.S. Pat. No. 4,407,267 to Iacovangelo et al. Typically porous, sintered Ni-Cr anodes and porous NiO cathodes are disposed on opposite major surfaces of a porous electrolyte tile. A tile of such as lithium aluminate (LiAlO$_2$), or other inert ceramic is filled with molten alkali metal carbonate electrolyte, (e.g. Li$_2$CO$_3$/K$_2$CO$_3$) in each cell in a fuel cell stack. Stacks with several hundred fuel cells are contemplated in a typical power supply. Severe electrolyte redistribution has been observed even in experimental stacks with substantially fewer cells than that expected for an operational power supply.

The exact mechanism by which the electrolyte migrates is not clearly understood. Nonetheless, it is known that the cells near the negative end of the stack become flooded while the cells towards the positive end of the stack become depleted or dry of molten electrolyte. Some have suggested that an electrical shunt current through the manifold gasket causes electrolyte migration toward the negative end of the stack. The depletion of electrolyte severely impairs the performance of the affected cells and greatly increases the overall resistance of the stack.

The efforts to limit electrolyte redistribution have not been completely successful. Ordinarily, the fuel cell stack is arranged with the positive end at the bottom and the negative end at the top so that gravity will resist migration of electrolyte toward the more negative cells. However, this has not proven sufficient to prevent redistribution of electrolyte towards the upper cells. Others have modified electrode and stack component properties with some sucess to limit electrolyte migration. However, such modifications have unneccessarily added to the complexity and cost of the cell stack.

Therefore, in view of the above, it is an object of the present invention to provide a device for equalizing the electrolyte content along the height of a fuel cell stack.

It is a further object to provide means for returning electrolyte from the negative to the positive end of a fuel cell stack during operation.

It is also an object to provide a device to effect equalization of electrolyte content throughout a fuel cell, stack height without unnecessarily adding to the stack complexity.

SUMMARY OF THE INVENTION

In accordance with the present invention, there is provided a device for equalizing the molten carbonate electrolyte content along the height of a fuel cell stack. The device includes a passageway for electrolyte flow from a first end portion adjacent to the negative end of the stack to a second end portion adjacent to the positive end of the stack. The passageway is partially filled in its first and second end portions with a porous ceramic wick, wettable by the molten electrolyte to draw in and to feed out the molten electrolyte. The first end portion is provided with means for vaporizing and transferring electrolyte to the second end portion where the electrolyte is condensed and conducted back to the positive end of the stack face.

In a more specific aspect of the invention, the porous cermic wick is selected of an electrolyte wettable material such as LiAlO$_2$, calcia stabilized ZrO$_2$, Li$_2$ZrO$_3$, or LiFeO$_2$.

In further aspects of the invention, the electrolyte passageway is placed in a manifold containing the oxidant gas.

In one other important aspect, means are provided to inject a modifying gas into the gas passageway to control the recirculation of the molten electrolyte.

BRIEF DESCRIPTION OF THE DRAWINGS

The present invention is illustrated in the accompanying drawings wherein.

DETAILED DESCRIPTION OF THE PREFERRED EMBODIMENTS

Figure 1:
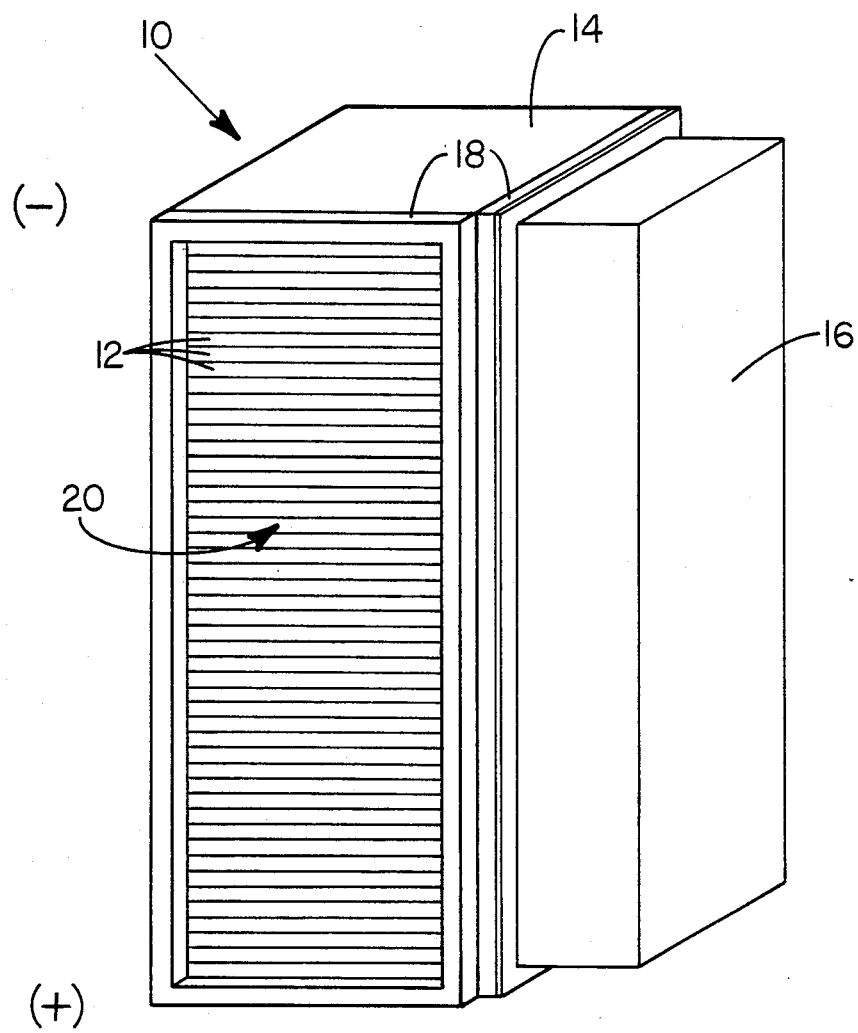
FIG. 1 is a perspective view of a prior art fuel cell stack with a gas manifold in place.

FIG. 1 illustrates a known fuel cell stack 10 to which the device of the present invention is applicable. The stack comprises a plurality of individual fuel cells 12 between end plates 14 at the uppermost and lowermost surfaces. The stack 10 ordinarily is arranged with individual cells 12 separated by electrically conductive impervious layers (13, in FIG. 2) and with the anodes placed atop the cathodes in each cell. This establishes negative polarity at the stack top and positive polarity at the stack bottom.

One of four manifolds 16 is shown in place sealed against a stack face 20. Two manifolds provide reactant gases while two manifolds collect product gases and unreacted reactants. Each of the manifolds 16 is sealed at its perimeter against the stack face with a sealing member 18. Sealing member 18 is a porous, fiberous gasket of high temperature material or some other suitable high temperature seal such as a ceramic caulk or resilient strip.

In high temperature, molten carbonate fuel cells, sealing member 18 is of a porous ceramic material, for instance of lithium aluminate or of zirconia stabilized with calcia or yttria. In addition, a support frame (not shown) such as described in Guthrie, U.S. Pat. No. 4,414,294 may be provided in conjunction with gasket 18. Gasket or sealing member 18 as illustrated herein refers to the porous gasket material contiguous with the face of fuel cell stack 20.

The molten carbonate electrolyte, typically Li$_2$CO$_3$/K$_2$CO$_3$ in a ratio of about 1.6 to 1.0, is retained in a porous tile or matrix 19 (see FIG. 2) disposed between the anode 17 and cathode 15 of each cell. The electrolyte matrix 19 extends laterally to the cell stack face 20 and serves as a seal wet with molten carbonate between each anode and cathode pair. Consequently, the molten electrolyte is present at the stack face 20 in contact with manifold gasket 18. Housing or separator sheets 13 of corrosive resistant metal can be provided as shown to isolate the electrodes from the stack face.

Figure 2:
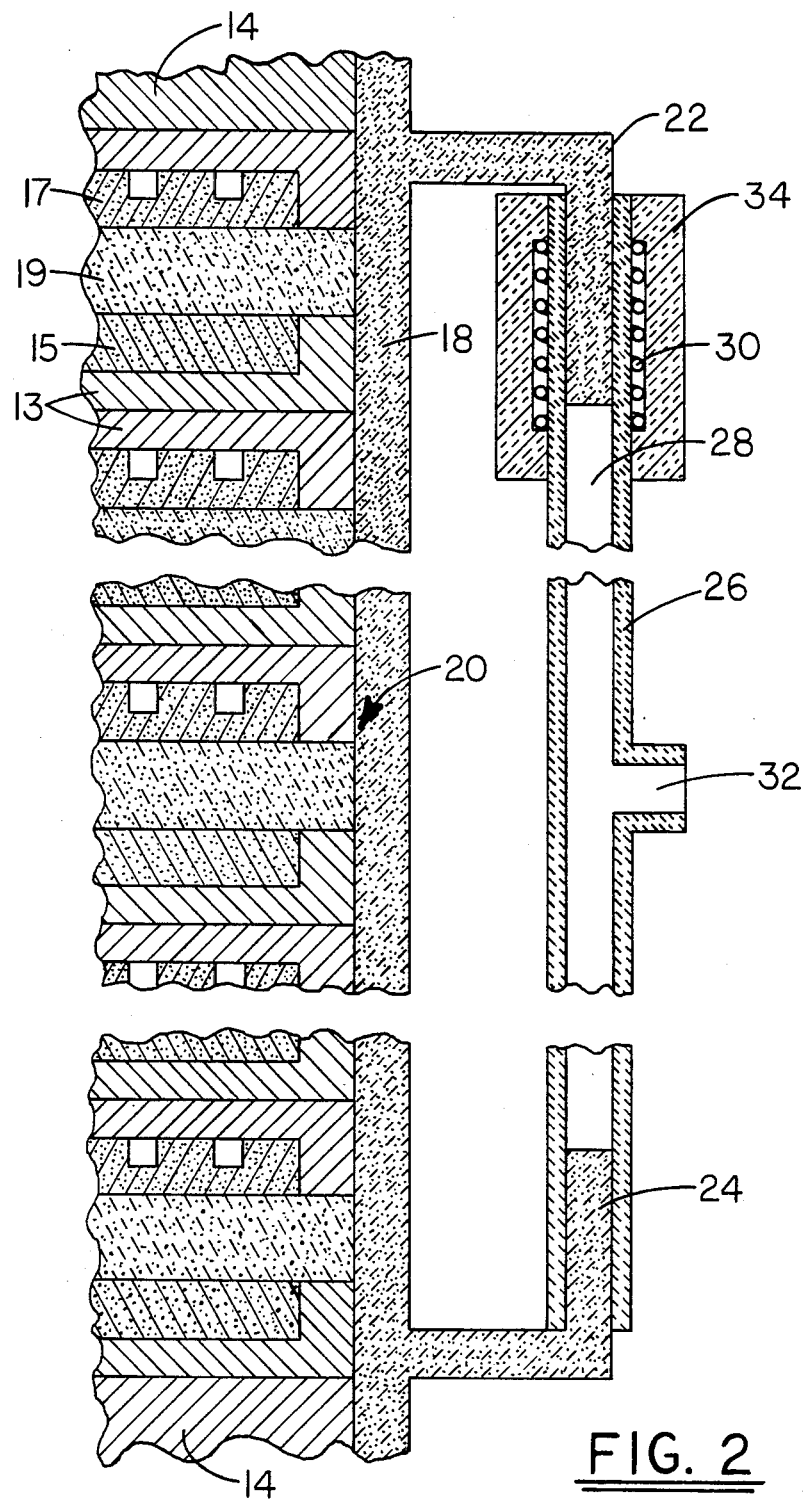
FIG. 2 is an enlarged fragmentary view of an electrolyte equalization device installed on the fuel cell stack of FIG. 1.

In FIG. 2, one embodiment of the invention is illustrated. Porous ceramic wicks 22 and 24 extend from sealing member 18 and the face 20 of the fuel cell stack into the opposite end portions of a ceramic conduit 26. Conduit 26 runs along the stack height within a manifold 16 (not shown in FIG. 2) to provide a passageway 28 for vapor from the upper to the lower regions of the stack. It will be clear that one or more conduits 26 can be provided in parallel. Heater coils 30 or other suitable heating means are provided at the upper portion of conduit 26 to increase the vapor pressure of the molten electrolyte sorbed in upper wick 22. For vapor pressure control, a port 32 is provided in the midportion of conduit 26 to introduce a modifying gas.

Wicks 22 and 24 are of a porous ceramic material suitable for sorbing and transfering molten metal carbonates by capillary forces. Ceramics such as lithium aluminate ($LiAlO_2$), calcia stabilized zirconia ($CaO$-$ZrO_2$), lithium zirconate ($Li_2ZrO_3$), and lithium ferrate ($LiFeO_2$) are contemplated for use.

The electrolyte equalization device can be installed in one or more of the gas manifolds of a fuel cell stack. Therefore, the wick material selected must be stable at the expected operating conditions. For instance, all of the above contemplated materials have proven stable under cathodic conditions but only $LiAlO_2$ an $CaO$-$ZrO_2$ have been tested with anode gases.

One theory of electrolyte loss from matrix 19 involves electrochemical pumping by the reactions:

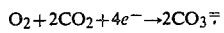

(at the stack face 20) and

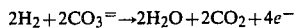

(at the cell anodes). Inasmuch as oxygen and carbon dioxide are present in the oxidant gas manifold, electrolyte is expected to readily migrate towards the corresponding cell stack face. Therefore, the electrolyte equalization device is advantageously placed in the oxidant gas manifold.

The wicks 22 and 24 are provided in intimate contact with porous sealing member 18 to ensure good conduction of the molten electrolyte. Advantageously, the wicks can be of the same piece and material as the porous sealing member. To facilitate stack assembly, the wicks 22 and 24 can be sinter bonded or mechanically bonded with a powdered ceramic interface to the sealing member 18.

Ceramic conduit 26 is of a high temperature refractory material capable of sustaining the elevated temperature needed to vaporize the molten carbonate electrolyte. Ceramics such as alumina ($Al_2O_3$) or zirconia ($ZrO_2$) can be selected. By placing conduit 26 in a gas manifold the electrolyte transport path length is minimized and the electrolyte is contained at the high stack temperatures.

Heater coils 30 can be electrical coils disposed on the outside surfaces of ceramic conduit 26. The coils and upper portion of conduit 26 are insulated from the manifold gas by thermal insulation 34 to prevent heat loss.

Heater coils 30 can be selected from commercially available resistive wire elements typically used in electric heaters and furnaces. Coils suitable for temperatures of 700°–1200° C. are needed to raise the electrolyte temperature to above that of the stack operating temperature (e.g. 500°–700° C.) but not to exceed the electrolyte decomposition temperature ($Li_2CO_3$ 1300° C.). Electrical power for coil 30 can be provided by connections (not shown) across the fuel cell stack height or from an outside source.

Typically, the molten electrolyte is heated to a temperature of 800°–1000° C. in conduit 26 to provide increased vapor pressure for transferring electrolyte back to the lower portion of the stack. The reactant gas contacting the lower portion of conduit 26 and wick portion 24 provides cooling to condense the electrolyte vapor for return as molten electrolyte to the lower portion of the stack.

Electrolyte return rate advantageously is controlled by the addition of modifying gases through port 32 into conduit 26. Small amounts of moisture and carbon dioxide in air diluent can be introduced to produce a minor fraction of alkali metal hydroxide in the electrolyte. Hydroxides lower the electrolyte melting point and increase the vapor pressure in conduit 26. Reaction with increased carbon dioxide concentrations in the cell stack tranforms the hydroxides back to carbonates in the lower portion of the cell stack. In addition, it is expected that potassium and lithium will convert to hydroxides at different reaction rates to permit control of their relative concentrations through addition of the modifying gas.

The following example is provided merely by way of illustration and is not intended to limit the scope of the invention in any manner beyond that defined in the claims.

EXAMPLE

A fuel cell stack of 200 cells (about 25×25 cm) with porous nickel anodes, porous nickel oxide cathodes and compacted lithium aluminate powder as matrix for $Li_2CO_3$ - $K_2CO_3$ electrolyte is expected to have about 0.04 grams per hour of electrolyte migration into the upper cells. A 200–500 watt electrical heater is installed on an about 5 centimeter diameter alumina conduit within the oxidant gas-supply manifold as described above and shown in FIG. 2. Wicks of porous lithium aluminate pass from intimate contact with the manifold gasket into the upper and into the lower end portions of the conduit for return of the electrolyte. A source of compressed air and carbon dioxide humidified with up to 90° C. water saturation is made available for a controlled flow of up to about 1 liter per hour into the alumina conduit.

Although the present invention has been described in terms of the specific embodiment, it will be clear that various changes in the materials, parts and details can be made by one skilled in the art within the scope of the appended claims.

The embodiments of this invention in which an exclusive property or privilege is claimed are defined as follows:

1. A device for equalizing the molten carbonate electrolyte content along the height of a fuel cell stack, with a voltage gradient of negative and positive polarity, said stack having a manifold for reactant gas communicating with a stack face and a porous sealing member in sealing relationship between edges of the manifold and the stack face, said device comprising:

a passageway for electrolyte flow having a first end portion adjacent to the negative end and a second end portion adjacent to the positive end of the stack height;

a first porous ceramic wick, wettable by molten carbonate electrolyte, extending from the porous sealing member into the first end portion of said passageway adjacent to the negative end of the stack;

a second porous ceramic wick, wettable by electrolyte extending from the porous sealing member into the second end portion of said passageway adjacent to the positive end of the stack; and means for vaporizing molten carbonate electrolyte in the first end portion of the passageway, and means for condensing the carbonate electrolyte vapor in the second end portion of said passageway to return molten carbonate to the positive end of the cell stack.

2. The device of claim 1 wherein inlet means are provided between the first and second end portions of the passageway for introducing gas into the passageway.

3. The device of claim 2 wherein said inlet means are provided for introducing carbon dioxide and water vapor in an air carrier gas into said passageway.

4. The device of claim 1 wherein said porous ceramic wick is selected from the group of molten carbonate wettable ceramics consisting of $LiAlO_2$, $Li_2ZrO_3$, $LiFeO_2$, and calcia stabilized $ZrO_3$.

5. The device of claim 1 wherein the fuel cell stack is provided with a plurality of manifolds for supplying reactant gas and for withdrawing product and unreacted gases and wherein said passageway is placed in at least one of the manifolds.

6. The device of claim 5 wherein said passageway is placed within a manifold containing the oxidant gas of the fuel cell stack.

7. The device of claim 6 wherein said manifold contains a gas mixture including carbon dioxide and oxygen at sufficiently high concentration to form molten carbonate at the stack face.

8. The device of claim 1 wherein said first and second wicks are in intimate bonded contact with said manifold sealing member.

9. The device of claim 8 wherein said first and second porous wicks are of the same material piece as said sealing member.

* * * * *